(No Model.)
O. C. BURDICT.
CLUTCH.
No. 305,372.  Patented Sept. 16, 1884.
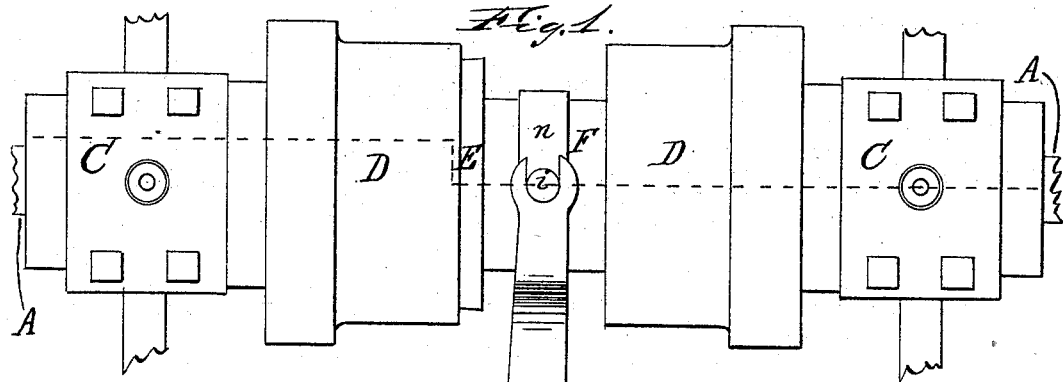
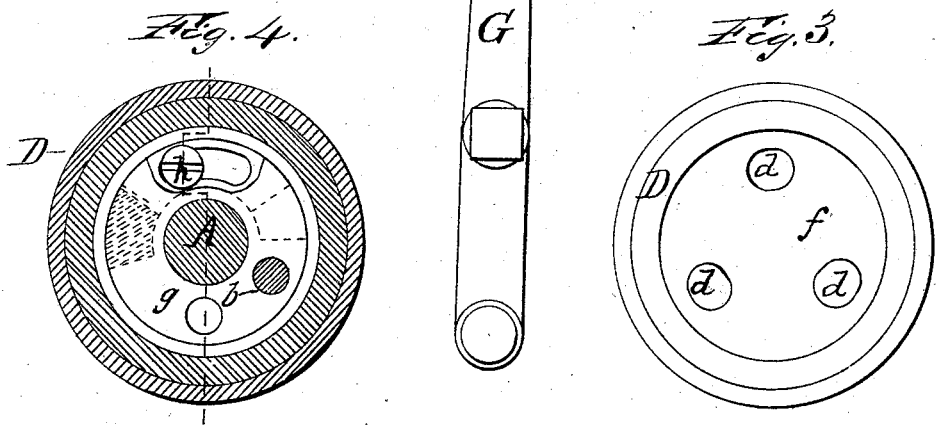
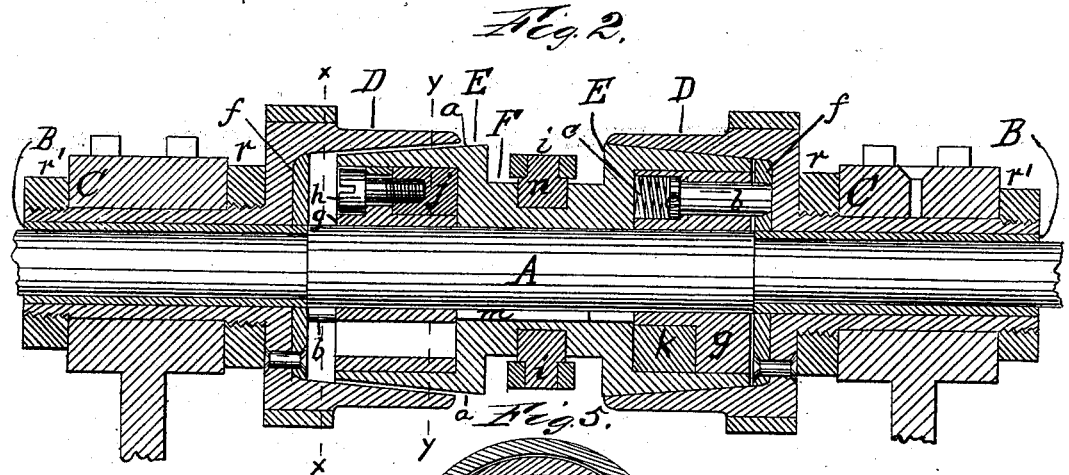
Witnesses.
Edw. K. Brewood
J. E. Warner
Inventor.
O. C. Burdict
by his Atty.
E. S. Renwick

UNITED STATES PATENT OFFICE.

ORRIN CLARK BURDICT, OF BUFFALO, NEW YORK.

CLUTCH.

SPECIFICATION forming part of Letters Patent No. 305,372, dated September 16, 1884.

Application filed January 24, 1884. (No model.)

*To all whom it may concern:*

Be it known that I, ORRIN CLARK BURDICT, of Buffalo, in the county of Erie and State of New York, have made an invention of certain new and useful Improvements in Clutches; and I do hereby declare that the following, taken in connection with the accompanying drawings, is a full, clear, and exact description and specification of the same.

Clutches as generally constructed previous to my invention may be divided into two classes—viz., friction-clutches and positive clutches. With the former class shafts which are to be made to revolve in unison are coupled by the frictional contact of the surfaces, which are secured to the shafts and are pressed strongly in contact. With the second class the shafts are coupled by interlocking projections or teeth secured to one shaft with corresponding projections or teeth secured to the other shaft. The first class is advantageous, because the coupling of the shafts can be effected gradually and without material jar; but strong pressure is required to hold the frictional surfaces in contact, and there is a constant tendency of one of the surfaces to slip upon the other, so that this kind of clutch is not, in my opinion, reliable for a positive coupling of shafts. The positive clutches are advantageous, because, when the connection of the clutch projections or clutch-teeth is made, the coupled shafts revolve in perfect unison, and but slight force is required to hold the members of the clutch engaged with each other; but this class of clutches has the defect that the engagement is effected with the jar incident to the abrupt contact of the clutch projections or teeth, and this jar becomes excessive when the driving-shaft is revolving at a high speed.

The object of the present invention is to obtain the advantageous results of both the above classes of clutches without the disadvantages incident to either; and to this end my invention consists of certain combinations of mechanical devices, which are recited in detail in the claims at the close of this specification.

In order that the invention may be fully understood, I have represented in the accompanying drawings, and will proceed to describe, two of my clutches as applied to couple the shaft of a machine alternately with two driving-shafts revolving in opposite directions, it being understood that the construction of the clutch mechanism thus represented may be greatly varied without ceasing to embody my invention.

Figure 1 of the drawings represents a top view of the said shafts and clutch mechanism. Fig. 2 represents a central section of the same. Fig. 3 represents a face view of one of the members of the clutch with the other members removed. Fig. 4 represents a transverse section through one of the clutches at the line $x\ x$ of Fig. 2, and Fig. 5 represents a similar section at the line $y\ y$ of Fig. 2.

The shaft A, which in this case is to be driven in alternately opposite directions, is a solid shaft, and is fitted to turn in the bores of two tubular driving-shafts, B B, which are assumed to be caused to revolve continuously in opposite directions by means of belts applied to belt-pulleys secured to said shafts. These tubular driving-shafts are fitted to revolve in the boxes C C, and each carries one member, D, of the clutch, by which the coupling of the driven shaft A to it is effected. The other member, E, of the clutch is connected with a sleeve, F, which is fitted to slide upon the driven shaft, but is compelled to turn with it by means of a spline, $m$, fitted to a groove in the sleeve F. The driven member E of the clutch in these examples of my invention has a conical surface, $a$, which is fitted to a corresponding cone-formed cavity or cup of the driving member D of the clutch, so that when the former is pressed into the latter the former commences to revolve by the frictional contact of the conical surface of the driving member D with the conical surface of the driven member. In addition to the conical frictional surface of the driven member, it has a clutch-pin, $b$, which is fitted to slide parallel, or thereabout, with the shaft from the driven member E of the clutch to the driving member D thereof, and is pressed toward the latter by means of a spring, $c$, the pin being furnished with a head, $e$, or stop, to prevent it from being protruded out of its socket, and to enable the pin to be pulled away from the driving member D of the clutch when the clutch-sleeve is moved for that purpose. The driving member D has, in addition to its conical frictional surface, a striking-plate, $f$, which is secured to it and perforated with three pin-holes, $d$, with any one of which the clutch-pin $b$ may engage when the driven member E is moved toward the driving member D. Whenever the clutch-pin $b$ engages in any one of the holes of the striking-plate $f$, a positive coupling of the driven shaft A and the driving-shaft is effected, and the two revolve in absolute unison so long as the engagement continues.

From the above description and drawings it appears that if the driven member E of the clutch is moved along the intermediate shaft, A, so far from the driving member D that the clutch-pin $b$ is disengaged from the striking-plate $f$, which is the condition in the left-hand clutch of the drawing, the driven shaft A and the driving-shaft B are uncoupled. When, then, the driven member E is moved from the uncoupled position toward the driving member D, the first action is the gradual turning of the driven shaft A by the frictional contact of the two conical surfaces, and the end of the clutch-pin $b$ is simultaneously pressed against the striking-plate. As one member of the clutch slips upon the other, some one of the holes of the striking-plate comes opposite the end of the clutch-pin, whereupon it is engaged therein by the action of its spring $c$, thereby effecting a positive coupling of the two shafts.

In the example represented in the drawings the two clutches are reversed right and left, so that when the clutch-sleeve F is moved to engage the members of the right-hand clutch those of the left-hand clutch are disengaged, and vice versa.

In order that any jar incident to the direct engagement of the clutch-pin $b$ with the striking-plate $f$ may be neutralized, the block or stock $g$, in which the clutch-pin $b$ is fitted to slide, is not fixed to the driven member E of the clutch, but is fitted to turn therein, and is connected therewith by a bolt, $h$, which is screwed into a fast segment, $j$, and is passed through a slot in the pin-block $g$, thus permitting the pin-block to turn a short distance in the driven member of the clutch. The back of the pin-block has a segmental cavity, which receives in it the fast segment $j$, and a block of vulcanized rubber, $k$, is inserted between the driving end of the cavity of the pin-block and the driven end of the fast segment $j$. By reason of this construction it results that whenever the clutch-pin $b$ is engaged in the striking-plate $f$ the sudden pressure is transmitted from the pin-block $g$ to the fast segment $j$ and to the driven shaft A through the intervention of the block of rubber $k$, which is momentarily compressed, and, being a spring-bumper, neutralizes any jar that might ensue from the too sudden coupling of the two shafts.

In order that the sleeve F, carrying the movable member E of the clutch, may be readily moved to and fro on the shaft A and held in its positions, the forked clutch-lever G is provided and its forked arms are applied to the trunnions $i$ of a split ring, $n$, which is fitted loose enough in a groove of the clutch-sleeve F to permit the latter to turn freely in it.

In order that the wear of the collar $r$ of the driving-shaft B or of the sides of the box C, in which it revolves, may be taken up, one of the collars is screwed upon the driving-shaft, so that it may be screwed toward the face of the box, and the play produced by wear may be taken up. By preference the other collar, $r'$, is screwed to its shaft in like manner.

In the preceding description I have, for convenience, called the member of the clutch which is connected with the shaft A the "driven member," and have also called the cup-formed member D of the clutch the "driving member;" but it is evident that the two members of the clutch may be transposed if that course is deemed expedient.

The sliding spring clutch-pin may be replaced by its equivalent—viz., a sliding spring clutch-tooth or projection of other than cylindrical form—and the projection may be in one piece with its stock, and the two arranged to slide together under the action of a spring.

A part of my invention may be used without the residue, as recited in the following claims.

I claim as my invention—

1. The combination, substantially as before set forth, of the frictional surfaces of the two members of the clutch, the striking-plate connected with one of said members, and the clutch-pin connected with the other member by means of a movable pin-block and spring-bumper.

2. The combination, substantially as before set forth, of the striking-plate connected with one member of the clutch, and the sliding spring clutch-pin connected with the other member of the clutch by means of a movable pin-block and spring-bumper.

3. The combination, substantially as before set forth, of the two members of the clutch, the clutch-sleeve by which one member is moved toward the other member in the direction of the lengths of their respective shafts, the screwed shaft-collar, and the stationary box or bearing, against which said collar bears with the capacity of being set up thereto.

In witness whereof I have hereto set my hand this 11th day of January, A. D. 1884.

ORRIN CLARK BURDICT.

Witnesses:
L. VAN OSTRAND,
A. B. SPRAGUE.